United States Patent
Yun et al.

(10) Patent No.: US 12,472,731 B2
(45) Date of Patent: Nov. 18, 2025

(54) THERMOSET SEALANT FILM

(71) Applicant: TE Connectivity Services GmbH, Schaffhausen (CH)

(72) Inventors: Hyo Chang (Chris) Yun, Fremont, CA (US); Lei Wang, Fremont, CA (US)

(73) Assignee: TE CONNECTIVITY SOLUTIONS GmbH, Schaffhausen (CH)

( * ) Notice: Subject to any disclaimer, the term of this patent is extended or adjusted under 35 U.S.C. 154(b) by 522 days.

(21) Appl. No.: 17/406,184

(22) Filed: Aug. 19, 2021

(65) Prior Publication Data

US 2023/0054693 A1 Feb. 23, 2023

(51) Int. Cl.
| | |
|---|---|
| *B32B 27/18* | (2006.01) |
| *B29C 65/48* | (2006.01) |
| *B32B 27/08* | (2006.01) |
| *B32B 27/38* | (2006.01) |
| *H01R 13/52* | (2006.01) |
| *B29K 663/00* | (2006.01) |

(52) U.S. Cl.
CPC ............ *B32B 27/18* (2013.01); *B29C 65/485* (2013.01); *B32B 27/08* (2013.01); *B32B 27/38* (2013.01); *H01R 13/5216* (2013.01); *B29K 2663/00* (2013.01); *B32B 2250/24* (2013.01); *B32B 2307/31* (2013.01); *B32B 2457/00* (2013.01); *B32B 2581/00* (2013.01)

(58) Field of Classification Search
CPC ......... B32B 27/08; B32B 27/18; B32B 27/38; B32B 2250/24; B32B 2307/31; B32B 2457/00; B32B 2581/00; H01R 13/5216
See application file for complete search history.

(56) References Cited

U.S. PATENT DOCUMENTS

| | | | | |
|---|---|---|---|---|
| RE30,843 E | * | 1/1982 | Flint | ............ C08J 3/241 428/323 |
| 4,798,752 A | * | 1/1989 | McLoughlin | .......... B29C 48/21 428/56 |

FOREIGN PATENT DOCUMENTS

| | | | | |
|---|---|---|---|---|
| CN | 103827236 A | | 5/2014 | |
| CN | 107207923 A | | 9/2017 | |
| GB | 1452785 A | | 10/1976 | |
| GB | 2097401 A | | 11/1982 | |
| JP | 2009260232 A | | 11/2009 | |
| JP | 2012031253 A | | 2/2012 | |
| JP | 2016155887 A | * | 9/2016 | ............ C09J 11/06 |
| JP | 2017082144 A | | 5/2017 | |

OTHER PUBLICATIONS

Chinese Office Action with English translation dated Dec. 14, 2024, corresponding to Application No. 202210990829.5, 19 pages.

* cited by examiner

*Primary Examiner* — Gerard Higgins

(57) ABSTRACT

A thermoset sealant film includes an epoxy and a hardener. The hardener is integrated with the epoxy and remains physically distinct from the epoxy in a formed state of the thermoset sealant film.

7 Claims, 5 Drawing Sheets

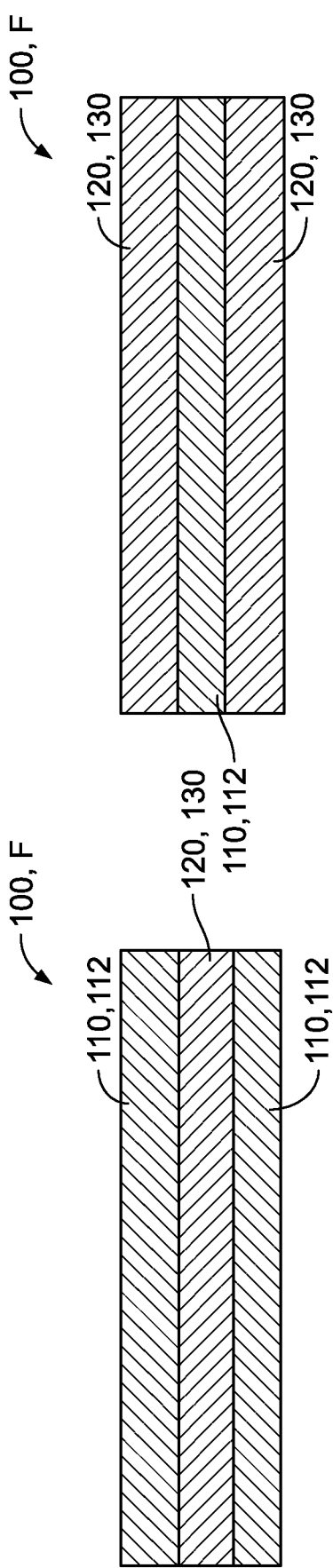
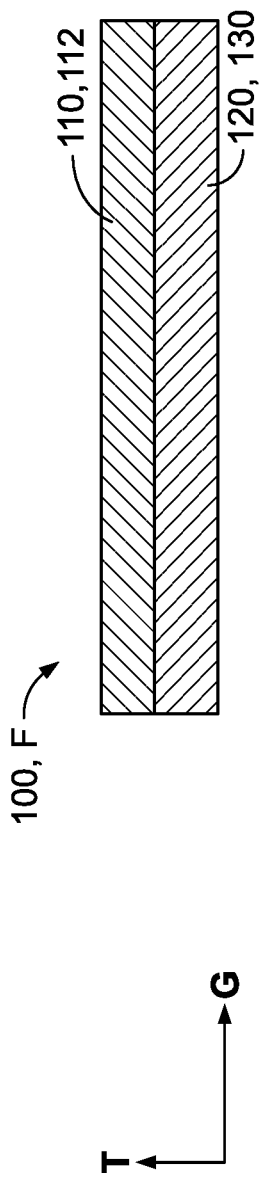

THERMOSET SEALANT FILM

FIELD OF THE INVENTION

The present invention relates to a sealant film and, more particularly, to a thermoset sealant film.

BACKGROUND

A thermoplastic material, for example hot melt, is often used to seal a cavity of a housing against the ingress of dirt, water, and other environmental elements. The thermoplastic material is placed into the cavity, heated above approximately 200° C. to melt, flow, and fill the cavity, and cooled to solidify within the cavity.

The heating required to initially melt thermoplastic materials is often around or above a melting temperature of the housing in which the thermoplastic material is disposed. Consequently, the heating of the thermoplastic material must be carefully localized to prevent softening and deformation of the housing. Further, once the thermoplastic material has solidified within the cavity, the thermoplastic material can be softened when heated above approximately 100° C. Many application conditions of the housing, however, experience environmental temperatures of up to 125° C., which can cause softening of the thermoplastic and loss of the seal in the cavity.

SUMMARY

A thermoset sealant film includes an epoxy and a hardener. The hardener is integrated with the epoxy and remains physically distinct from the epoxy in a formed state of the thermoset sealant film.

BRIEF DESCRIPTION OF THE DRAWINGS

The invention will now be described by way of example with reference to the accompanying Figures, of which:

FIG. 3A is a schematic sectional view of a thermoset sealant film according to an embodiment;

FIG. 3B is a schematic sectional view of a thermoset sealant film according to another embodiment;

FIG. 3C is a schematic sectional view of a thermoset sealant film according to another embodiment;

DETAILED DESCRIPTION OF THE EMBODIMENT(S)

Figure 1:
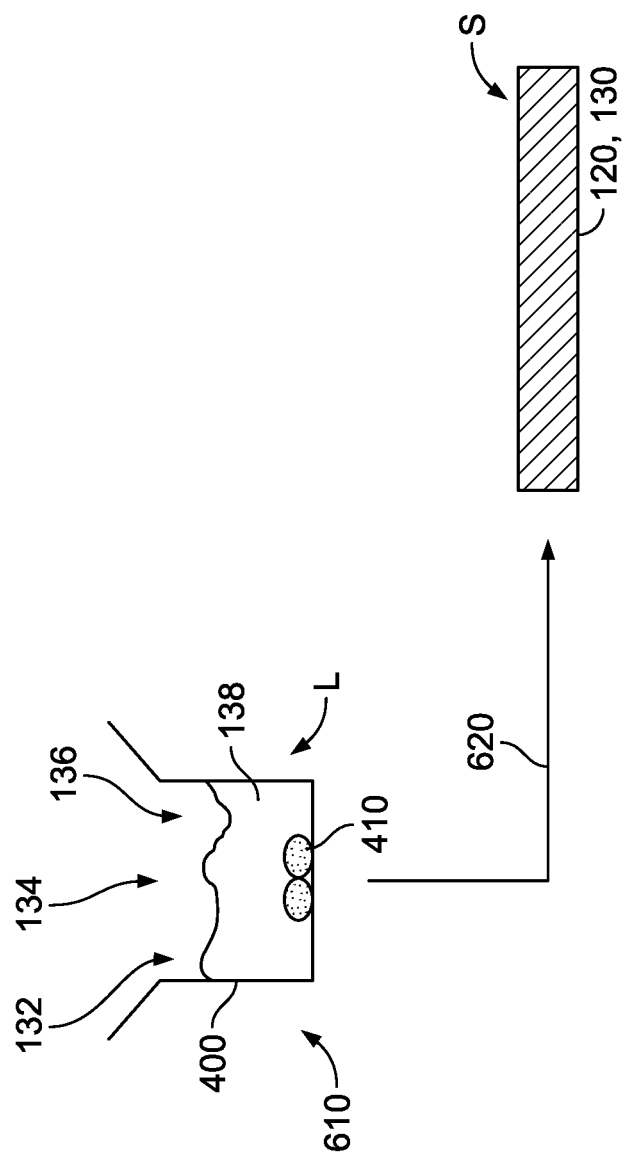
FIG. 1 is a schematic diagram of a process of forming a hardener film according to an embodiment.

Exemplary embodiments of the present disclosure will be described hereinafter in detail with reference to the attached drawings, wherein like reference numerals refer to like elements. The present disclosure may, however, be embodied in many different forms and should not be construed as being limited to the embodiments set forth herein; rather, these embodiments are provided so that the present disclosure will convey the concept of the disclosure to those skilled in the art. In addition, in the following detailed description, for purposes of explanation, numerous specific details are set forth in order to provide a thorough understanding of the disclosed embodiments. However, it is apparent that one or more embodiments may also be implemented without these specific details.

Figure 2:
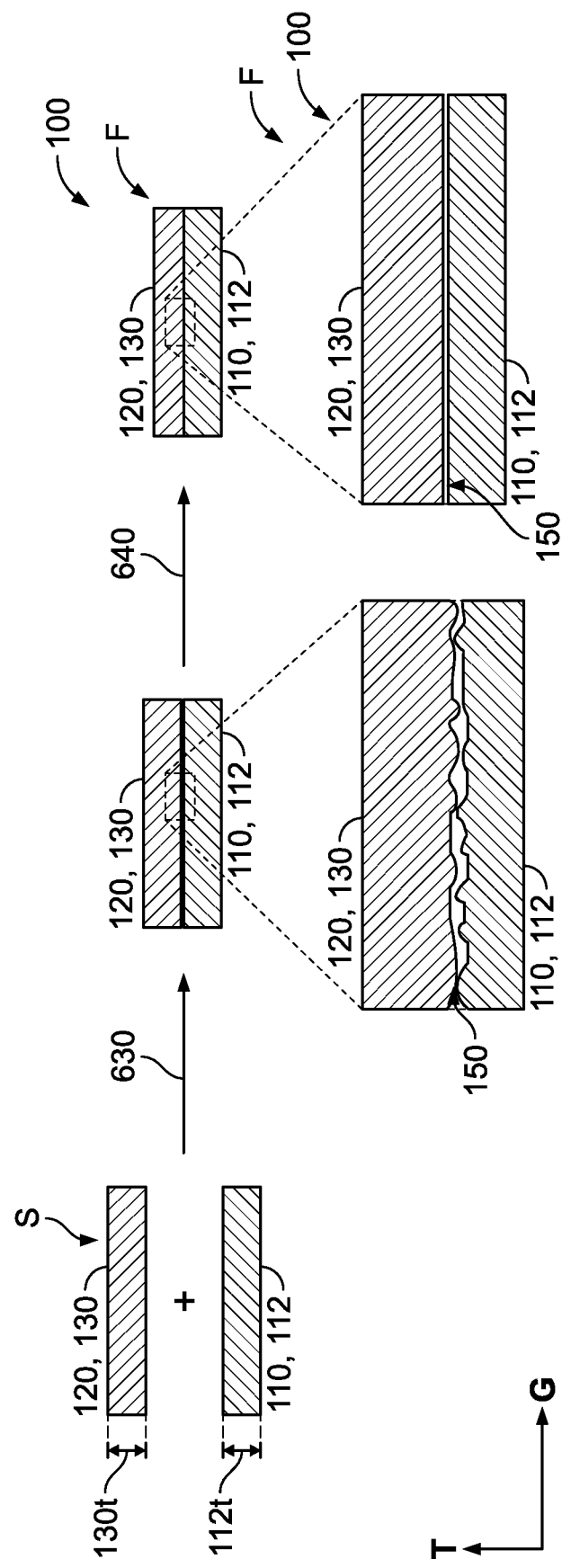
FIG. 2 is a schematic diagram of a process of forming a thermoset sealant film according to an embodiment.
Figure 4:
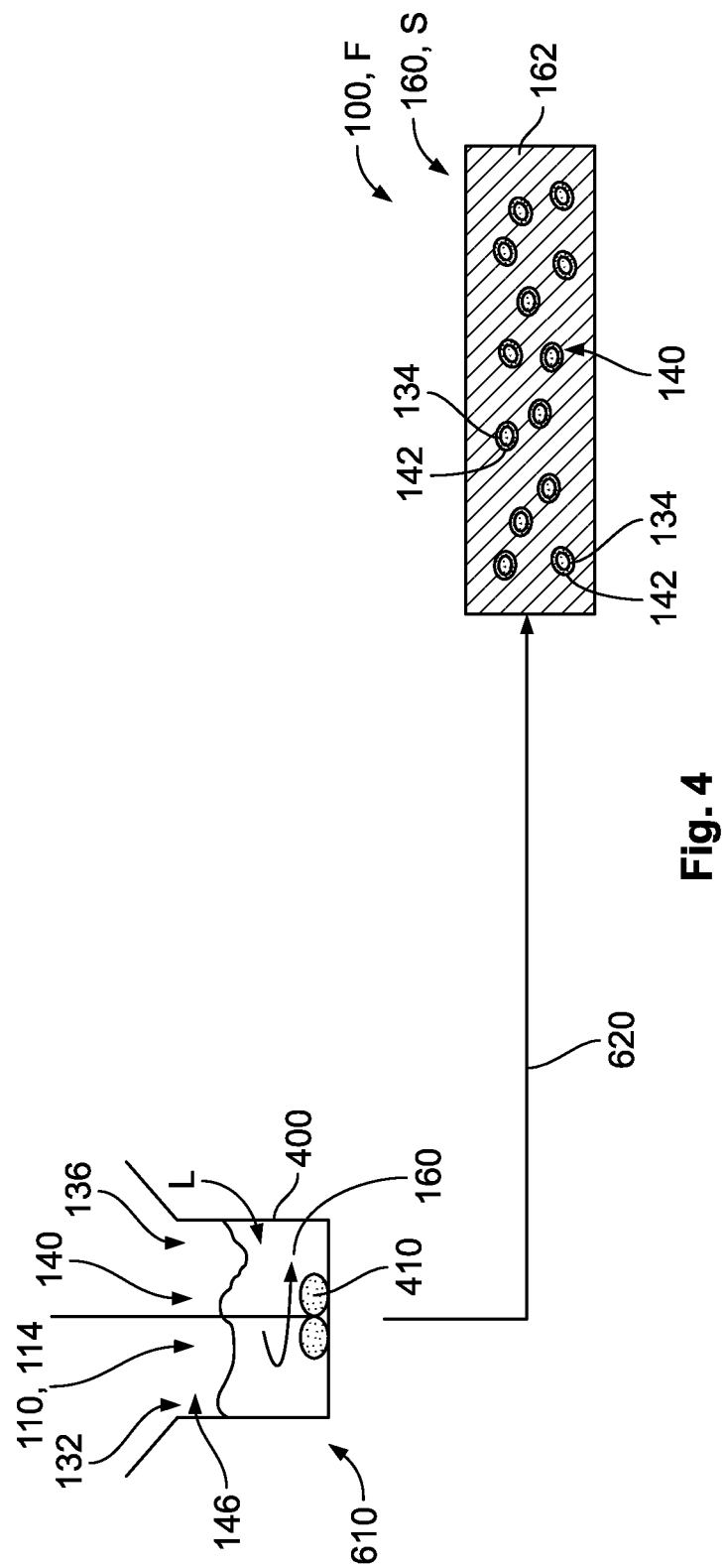
FIG. 4 is a schematic diagram of a process of forming a thermoset sealant film according to another embodiment.

A thermoset sealant film 100 formed according to various embodiments is shown in FIGS. 1-4. The thermoset sealant film 100 includes an epoxy 110 and a hardener 120 integrated with the epoxy 110 in a formed state F of the thermoset sealant film 100, as shown in FIGS. 2-4. A first embodiment of the thermoset sealant film 100 shown in FIGS. 1-3 will now be described in greater detail.

The thermoset sealant film 100 according to the first embodiment, as shown in FIGS. 1 and 2, includes the hardener 120 formed as a hardener film 130. The hardener film 130 includes a polymeric binder 132, a hardener material 134, and a catalyst 136.

The polymeric binder 132, in various embodiments, can include polyethylene oxide (PEO), polyethylene glycol (PEG), polypropylene glycol (PPG), ethylene vinyl acetate (EVA), polyacrylonitrile (PAN), polymethyl methacrylate (PMMA), polyoxymethylene (POM), or any other polymeric binder material capable of binding the other materials of the hardener film 130 as described herein. The polymeric binder 132, in an embodiment, is greater than or equal to 5% and less than or equal to 95% of a material composition of the hardener film 130 by weight. In another embodiment, the polymeric binder 132 is greater than or equal to 10% and less than or equal to 80% of the material composition of the hardener film 130 by weight.

The hardener material 134, in various embodiments, can include any of a plurality of different types of amines, including but not limited to polyamine, aliphatic amine, cycloaliphatic amine, and aromatic amine. In other embodiments, the hardener material 134 can include polyamide, polymercaptane, dicyandiamide, imidazoles, or any other type of curing or hardening agent capable of curing or hardening the materials of the hardener film 130 as described herein. The hardener material 134, in an embodiment, is greater than or equal to 5% and less than or equal to 95% of the material composition of the hardener film 130 by weight. In another embodiment, the hardener material 134 is greater than or equal to 20% and less than or equal to 80% of the material composition of the hardener film 130 by weight.

The catalyst 136, in various embodiment, can include amine, quarternary ammonium or phosphonium salts, metal salt, triphenyl phosphine, imidazole, or any other type of catalyst that could be used in forming the hardener film 130 described herein. The catalyst 136, in an embodiment, is greater than or equal to 0.01% and less than or equal to 10% of the material composition of the hardener film 130 by weight. In another embodiment, the catalyst 136 is greater than or equal to 0.1% and less than or equal to 1% of the material composition of the hardener film 130 by weight.

A process of forming the hardener film 130 is shown schematically in FIG. 1.

In a mixing step 610 of the process of forming the hardener film 130, the polymeric binder 132, the hardener material 134, and the catalyst 136 are placed in a mixing vessel 400 shown in FIG. 1 in the relative amounts described in the various embodiments above. The mixing vessel 400 may be any type of vessel of any size that is capable of containing and mixing the polymeric binder 132, the hardener material 134, and the catalyst 136 as described herein.

In the embodiment shown in FIG. 1, the polymeric binder 132, the hardener material 134, and the catalyst 136 are added into the mixing vessel 400 and are heated in the mixing vessel 400 to a temperature higher than a melting or softening point of the polymeric binder 132. In an embodiment, the mixing vessel 400 is heated to a temperature in a range greater than or equal to approximately 50° C. to less than or equal to approximately 150° C. The polymeric binder 132, the hardener material 134, and the catalyst 136 are mixed with a stirring device 410 of the mixing vessel 400 to form a hardener mixture 138. The hardener mixture 138 is in a liquid state L in the mixing vessel 400 in this embodiment.

Following the creation of the hardener mixture 138, the hardener mixture 138 is cast in a casting step 620 from the liquid state L to a solid film state S to form the hardener film 130 shown in FIG. 1. The casting step 620 can be performed according to any known film casting process of resin materials, for example pouring the hardener mixture 138 in the liquid state L into a mold and allowing the hardener mixture 138 to transition from the liquid state L into the solid film state S in the mold. In the embodiment shown in FIG. 1, the hardener mixture 138 is cooled after casting to form the solid film state S.

In an embodiment, the casting step 620 does not require the application of heat to transition to the solid film state S forming the hardener film 130. The hardener film 130 remains in the solid film state S at room temperature. As used throughout the present specification, the term room temperature is intended to be a range of greater than or equal to 20° C. and less than or equal to 25° C.

In another embodiment, instead of heating the mixing vessel 400 as described above with respect to the embodiment shown in FIG. 1, a solvent 146 shown in FIG. 4 can be added to the polymeric binder 132, the hardener material 134, and the catalyst 136 and mixed in the mixing vessel 400 at room temperature to form the hardener mixture 138. In this embodiment, after the casting step 620, the hardener mixture 138 is dried instead of cooled to the solid film state S to form the hardener film 130.

The formation of the thermoset sealant film 100 using the hardener film 130 and the epoxy 110 is shown in FIG. 2. In the embodiment shown in FIGS. 1-3, the epoxy 110 is formed as an epoxy film 112. The epoxy film 112 may be formed of any type of epoxy that can be cast into a film and is in a solid state at room temperature.

As shown in FIG. 2, the hardener film 130 has a hardener film thickness 130t and the epoxy film 112 has an epoxy film thickness 112t in a thickness direction T perpendicular to a longitudinal direction G of the films 112, 130. In an embodiment, the hardener film thickness 130t and the epoxy film thickness 112t are controlled to give a ratio of an equivalent weight of the epoxy film 112 to an equivalent weight of the hardener film 130 of greater than or equal to 0.9 and less than or equal to 1.1.

To form the thermoset sealant film 100, the hardener film 130 in the solid film state S is first stacked or layered with the epoxy film 112 in a stacking step 630 shown in FIG. 2. As shown in FIG. 2, the stacking or placing of the hardener film 130 on the epoxy film 112 results in microscopic separation between the films 112, 130 at a gap 150 in the thickness direction T. The gap 150 depends on a roughness of each of the films 112, 130 and, in an embodiment, is in a range of greater than or equal to 1 µm and less than or equal to 5 mm. The films 112, 130 remain in a solid state at room temperature during the stacking step 630.

In a compressing step 640, the hardener film 130 and the epoxy film 112 that are stacked or layered with one another in the solid film state S are compressed together to create the thermoset sealant film 100 in the formed state F, as shown in FIG. 2. The compressing step 640 can be performed by any type of compressing device that is capable of compressing the hardener film 130 and the epoxy film 112 with one another as described herein.

In an embodiment, the compression in the compressing step 640 is a cold compression that takes place at a temperature less than 40° C. or at room temperature. In cold compression, as in the embodiment shown in FIG. 2, each film 112, 130 plastically flows as a result of the compression to minimize the gap 150; the gap 150 remains between the films 112, 130 in the shown embodiment.

In another embodiment, the compression in the compressing step 640 is a heat compression that compresses the films 112, 130 with one another while heating the films 112, 130 to a heat compressing temperature. The heat compressing temperature is below an on-set temperature that would melt and begin curing the hardener film 130 and the epoxy film 112, described in greater detail below, and is higher than a softening temperature of the polymeric binder 132. In an embodiment, the heat compressing temperature is less than 100° C. and, in an embodiment, is approximately 40° C.

In the formed state F of the thermoset sealant film 100 shown in FIG. 2, whether by cold compression or heat compression in the compressing step 640, the hardener film 130 is attached to and integrated with the epoxy film 112. The term "integrated" as used herein is intended to mean that the hardener film 130 is attached to the epoxy film 112 by the compression and that the films 112, 130 are not easily separated; the films 112, 130 remain attached to one another in normal handling of the thermoset sealant film 100.

Despite the integration of the films 112, 130, the films 112, 130 remain physically distinct from one another in the formed state F. The term "physically distinct" is intended to mean that materials of the respective films 112, 130 remain largely un-mixed and are identifiably separated from one another. In the case of cold compression in the compressing step 640, as shown in FIG. 2, the gap 150 remains between the integrated films 112, 130 at a microscopic level as described above to keep the films 112, 130 physically distinct from one another. In the case of heat compression, the gap 150 may be eliminated and the films 112, 130 may combine slightly with one another at an interface between the films 112, 130. The combining at the interface of the films 112, 130 in the formed state F as a result of heat compression is sufficiently minor that the films 112, 130 remain physically distinct and no hardening or curing of the thermoset sealant film 100 described in greater detail below occurs.

As shown in FIGS. 2 and 3A-3C, the thermoset sealant film 100 can be created in the formed state F in a number of different embodiments with a number of different arrangements of the hardener film 130 and the epoxy film 112. As shown in the embodiment of FIG. 2, one layer of the hardener film 130 can be arranged on top of one layer of the epoxy film 112 in the thickness direction T to form the thermoset sealant film 100 in the formed state F. As shown in FIG. 3C, the one layer of epoxy film 112 can alternatively be arranged on top of the one layer of the hardener film 130 in the stacking step 630 and compressed in the compressing step 640 to form the thermoset sealant film 100 in the formed state F. In other embodiments, as shown in FIGS. 3A and 3B, a plurality of hardener films 130 or epoxy films 112 can also be used to create the thermoset sealant film 100 in the formed state F; FIG. 3A shows one hardener film 130 stacked and compressed between two epoxy films 112 in the thickness direction T, while FIG. 3B shows one epoxy film 112 stacked and compressed between two hardener films 130 in the thickness direction T. In other embodiments, the thermoset sealant film 100 can be created in the formed state F from any number of hardener films 130 and any number of epoxy films 112 in any alternating arrangement, provided the films 112, 130 are stacked and compressed to be integrated with and physically distinct from each other.

The thermoset sealant film 100 according to a second embodiment is shown in FIG. 4. Like references refer to like elements and primarily the differences from the embodiments shown in FIGS. 1-3 will be described in detail herein.

The thermoset sealant film 100 according to the second embodiment, as shown in FIG. 4, includes the epoxy 110, the polymeric binder 132, the catalyst 136, a microencapsulated hardener 140, and a solvent 146.

The microencapsulated hardener 140, as shown in FIG. 4, includes a plurality of shells 142 each containing the hardener material 134. Only some of the shells 142 and hardener material 134 is labeled in FIG. 4 for clarity of the drawing, but the reference numbers and corresponding description applies equally to each of the like elements shown in FIG. 4. The shell 142 can be formed of any type of polymeric material used in microencapsulation that can be broken by heat or force to release the hardener material 134 contained within. The hardener material 134 is the same as the hardener material 134 in the embodiment of FIGS. 1-3. In various embodiments, each of the shells 142 of the microencapsulated hardener 140 can have a diameter from less than 1 μm to less than or equal to 100 μm. The solvent 146 can be any type of material that, when activated, for example through heat, aids in dissolving or otherwise breaking the material of the shells 142.

A process of forming the thermoset sealant film 100 according to the second embodiment is shown schematically in FIG. 4.

In a mixing step 610 of the process of forming the thermoset sealant film 100, the epoxy 110, the polymeric binder 132, the catalyst 136, the microencapsulated hardener 140, and the solvent 146 are placed in the mixing vessel 400 shown in FIG. 4. In the embodiment shown in FIG. 4, the epoxy 110 is a liquid epoxy 114 that is mixable with the other elements. The liquid epoxy 114, the polymeric binder 132, the catalyst 136, the microencapsulated hardener 140, and the solvent 146 are mixed with the stirring device 410 of the mixing vessel 400 to form a thermoset mixture 160. The thermoset mixture 160 is in a liquid state L in the mixing vessel 400.

Following the creation of the thermoset mixture 160, the thermoset mixture 160 is cast in the casting step 620 from the liquid state L to the solid film state S as described with respect to the embodiment in FIG. 1 above. In the embodiment shown in FIG. 4, the solid film state S of the thermoset mixture 160 is equivalent to the formed state F of the thermoset sealant film 100.

As shown in the embodiment of FIG. 4, the thermoset sealant film 100 in the formed state F has the microencapsulated hardener 140 embedded within a film material 162. The film material 162 is formed from a solidified mixture of the liquid epoxy 114, the polymeric binder 132, the catalyst 136, and the solvent 146. The plurality of shells 142 of the microencapsulated hardener 140 each containing the hardener material 134 are distributed throughout the film material 162, thereby being integrated with the epoxy 110 of the film material 162, and are separate from one another. The shells 142 provide a barrier keeping the hardener material 134 physically distinct from the epoxy 110 in the formed state F in the embodiment shown in FIG. 4. The thermoset mixture 160 forming the thermoset sealant film 100 remains in the solid film state S at room temperature.

Figure 5:
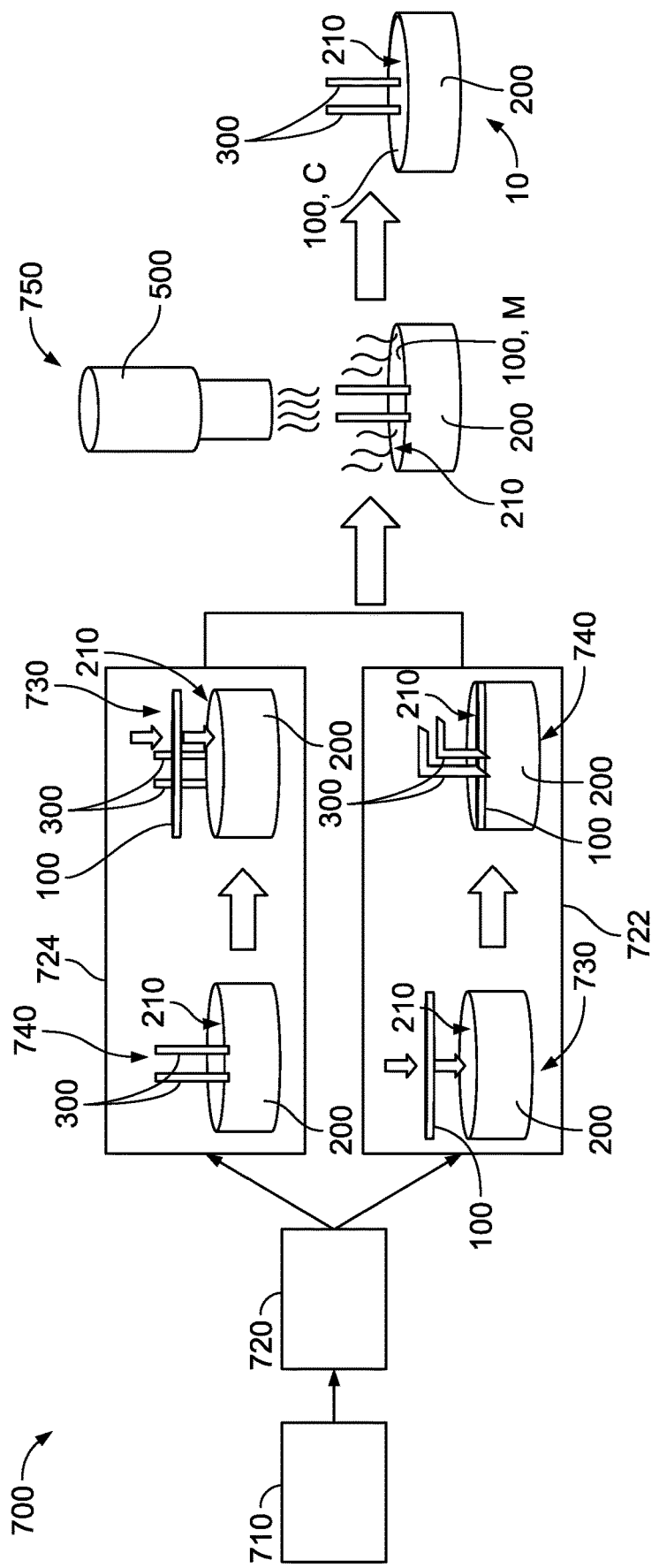
FIG. 5 is a schematic diagram of a process of sealing a housing with a thermoset sealant film.

A connector 10 including the thermoset sealant film 100 and a method or process 700 of sealing a housing 200 of the connector 10 with the thermoset sealant film 100 are shown in FIG. 5.

The connector 10, as shown in FIG. 5, includes the housing 200 having a cavity 210 and a plurality of pins 300 disposed in the cavity 210. In an embodiment, the housing 200 is formed of an insulative material and the pins 300 are formed of an electrically conductive material. The connector 10 has two pins 300 in the shown embodiment, but the connector 10 could have one pin 300 or three or more pins 300 in other embodiments. The connector 10 is depicted schematically in FIG. 5 and is merely exemplary; the following description applies to any connector 10 with any type of housing 200 having a cavity 210 that could accommodate the thermoset sealant film 100 for sealing.

In a forming step 710 shown in FIG. 5, the thermoset sealant film 100 is formed in the formed state F according to one of the embodiments shown in FIGS. 1-4 and described in detail above.

In a cutting step 720 following the forming step 710, as shown in FIG. 5, the thermoset sealant film 100 is cut while remaining in the formed state F. The thermoset sealant film 100 is cut to have a shape corresponding to a shape of the cavity 210 of the housing 200. In the shown embodiment, the thermoset sealant film 100 is cut into a circular or disc shape; in other embodiments, the thermoset sealant film 100 can be cut into any shape that is necessary to correspond to the shape of the cavity 210. In an embodiment, the cutting step 720 can be performed manually by an operator. In other embodiments, the cutting step 720 can be performed by a cutting device controlled by a computer, for example, to die cut the thermoset sealant film 100.

The thermoset sealant film 100 that has been cut is inserted into the cavity 210 in an inserting step 730 and the pins 300 are positioned in the cavity 210 in a positioning step 740. As shown in FIG. 5, the inserting step 730 and the positioning step 740 can occur in different orders in different embodiments. The thermoset sealant film 100 remains in the formed state F throughout the inserting step 730 and the positioning step 740.

In a first embodiment 722 shown in FIG. 5, the inserting step 730 occurs before the positioning step 740; the thermoset sealant film 100 is inserted into the cavity 210 in the inserting step 730 and the pins 300 are then inserted or stitched through the thermoset sealant film 100 into the cavity 210. The pins 300 penetrate and extend through the thermoset sealant film 100 upon insertion into the cavity 210.

In a second embodiment 724 shown in FIG. 5, the positioning step 740 occurs before the inserting step 730; the pins 300 are inserted into the cavity 210 in the positioning step 740 and the thermoset sealant film 100 is then pressed down over the pins 300 into the cavity 210. The pressing of the thermoset sealant film 100 over the pins 300 results in the pins 300 penetrating and extending through the thermoset sealant film 100.

The thermoset sealant film 100 disposed in the cavity 210 is heated in a heating step 750 shown in FIG. 5. The heating step 750 is performed with a heating device 500. In the shown embodiment, the heating device 500 is a handheld heat source that an operator can activate and use to direct heat toward the thermoset sealant film 100 in the cavity 210. In another embodiment, the heating device 500 can be an oven and the thermoset sealant film 100 disposed in the cavity 210 is heated to the temperature set for the oven. In the heating step 750, the thermoset sealant film 100 is heated from the formed state F into a melting state M and ultimately to a cured state C in the cavity 210.

In the embodiment shown in FIGS. 1-3, as the temperature of the thermoset sealant film 100 rises from room temperature during the heating step 750, the epoxy 110 formed as the epoxy film 112 and the hardener 120 formed as the hardener film 130 begin to melt, changing from the solid film state S to a melting state M. The films 112, 130 are no longer physically distinct in the melting state M and mix with one another. In an embodiment, the films 112, 130 change to the melting state M and mix at a melting temperature less than or equal to approximately 100° C., or in another embodiment less than or equal to 150° C.

When the films 112, 130 in the embodiment of FIGS. 1-3 reach the melting state M in the heating step 750, the hardener material 134 mixes with the epoxy 110. Because the mixture of the hardener material 134 and the epoxy 110 exhibits thermoset qualities, as the temperature of the thermoset sealant film 100 continues to rise or is held above 100° C. in the heating step 750, the mixture of the hardener material 134 and the epoxy 110 begins to cure into a cured state C. In an embodiment, once the hardener material 134 and the epoxy 110 have mixed and are no longer physically distinct, the cured thermoset sealant film 100 reaches the cured state C when the temperature of the thermoset sealant film 100 is held above 100° C. for a period of time. In some embodiments, the thermoset sealant film 100 additionally requires a post-heating period to reach the cured state C.

In the thermoset sealant film 100 according to the embodiment of FIG. 4, as the temperature of the thermoset sealant film 100 rises from room temperature during the heating step 750, the shells 142 of the microencapsulated hardener 140 begin to dissolve or break down and release the contained hardener material 134 into the film material 162 that contains the epoxy 110; the hardener material 134 is also no longer physically distinct from the epoxy 110 in the melting state M for the embodiment of FIG. 4. In an embodiment, the shells 142 begin to dissolve or break down at approximately 80° C. Once the hardener material 134 is released and mixes with the epoxy 110 in the film material 162, the thermoset sealant film 100 functions the same as the embodiment of FIGS. 1-3 described above to reach the cured state C.

The connector 10 with the thermoset sealant film 100 in the cured state C is shown in FIG. 5 following the heating step 750. The thermoset sealant film 100 is in a solid phase in the cured state C and seals the pins 300 and the cavity 210 of the housing 200. Due to the thermoset qualities of the hardener material 134 and the epoxy 110 that mix to form the cured state C, the thermoset sealant film 100 maintains structural integrity and the solid phase of the cured state C up to an operating temperature of approximately 150° C., or in another embodiment up to an operating temperature of less than or equal to 200° C., thus avoiding issues with softening or melting in most application conditions of the connector 10 and maintaining the seal of the cavity 210. The thermoset sealant film 100 is also hydrophobic in the cured state C, but cannot be heated for remolding after reaching the cured state C. The thermoset sealant film 100 according to the embodiments described herein allows for a more robust sealing of the cavity 210 of the housing 200 while also requiring a heating temperature of only around 100° C. or less than 125° C. to reach the melting state M and the cured state C, avoiding softening and deformation of the housing 200 while forming the seal in the cavity 210.

What is claimed is:

1. A thermoset sealant film, comprising:
   an epoxy; and
   a hardener integrated with the epoxy and remaining physically distinct from the epoxy in a formed state of the thermoset sealant film, the hardener is formed as a hardener film and the epoxy is formed as an epoxy film, the hardener film is attached to the epoxy film to form the thermoset sealant film in the formed state, a gap is disposed between the hardener film and the epoxy film in the formed state, the thermoset sealant film enters a melting state at which the epoxy is mixable with the hardener at a melting temperature less than or equal to 100° C., the epoxy and the hardener remain in a solid state at room temperature, the hardener is mixed with the epoxy and is no longer physically distinct from the epoxy in a cured state of the thermoset sealant film, the mixture of the hardener and the epoxy exhibits thermoset qualities and cures to the cured state when the mixture is held above 100° C., the thermoset sealant film in the cured state remains in a solid phase up to an operating temperature of approximately 200° C.

2. The thermoset sealant film of claim 1, wherein the hardener film includes a polymeric binder, a hardener material, and a catalyst.

3. The thermoset sealant film of claim 2, wherein the polymeric binder is greater than or equal to 10% and less than or equal to 80% of a material composition of the hardener film by weight.

4. The thermoset sealant film of claim 3, wherein the hardener material is greater than or equal to 20% and less than or equal to 80% of the material composition of the hardener film by weight.

5. The thermoset sealant film of claim 4, wherein the catalyst is greater than or equal to 0.1% and less than or equal to 1% of the material composition of the hardener film by weight.

6. The thermoset sealant film of claim 1, wherein a ratio of a weight of the epoxy film to a weight of the hardener film is greater than or equal to 0.9 and less than or equal to 1.1.

7. The thermoset sealant film of claim 1, wherein the epoxy film is one of a pair of epoxy films with the hardener film disposed between the epoxy films or the hardener film is one of a pair of hardener films with the epoxy film disposed between the hardener films.

* * * * *